UNITED STATES PATENT OFFICE.

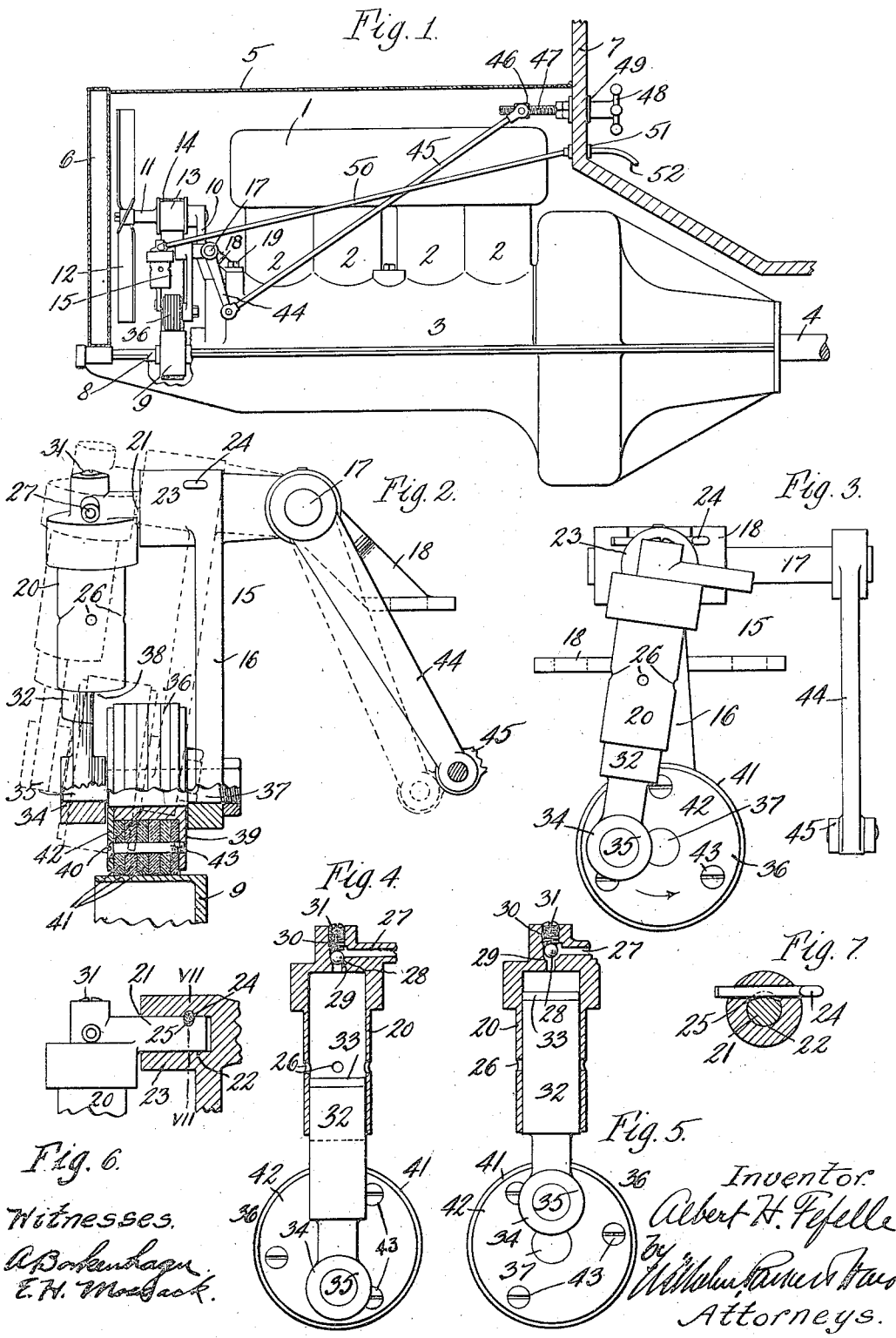

ALBERT H. FEFELLE, OF BUFFALO, NEW YORK, ASSIGNOR OF TWO-THIRDS TO WILLIAM LA HODNY, OF BUFFALO, NEW YORK.

PUMP OR COMPRESSOR FOR MOTOR-VEHICLES AND THE LIKE.

1,223,682. Specification of Letters Patent. Patented Apr. 24, 1917.

Application filed April 19, 1913. Serial No. 762,202.

*To all whom it may concern:*

Be it known that I, ALBERT H. FEFELLE, a citizen of the United States, residing at Buffalo, in the county of Erie and State of New York, have invented a new and useful Improvement in Pumps or Compressors for Motor-Vehicles and the like, of which the following is a specification.

This invention relates to pumps and more especially to an air compression pump intended to be mounted on an automobile and capable of being driven from the motor thereof, and used to supply compressed air for any desired purpose, such as inflating the pneumatic tires of the vehicle, supplying compressed air for a starting device for the motor, or for any other purpose for which compressed air may be found useful.

The present invention provides a pump or compressor which is exceedingly simple in construction and reliable in operation and is so designed that it may be very easily applied to an automobile motor without necessitating any changes in the latter. Its construction is such that it may be operated from the dash-board of the car or from any other convenient exposed position, thereby avoiding the necessity for opening the engine hood every time the device is to be used. In the preferred form of the invention the pump or compressor is mounted adjacent to the radiator and cooling fan of the motor so as to be cooled by the latter whereby its maximum efficiency as a compressor may be obtained.

In the accompanying drawings:

Figure 1 is a side elevation of a typical automobile motor having a preferred embodiment of the invention applied thereto, the radiator, hood and dash of the car being shown in section.

Fig. 2 is a side elevation, partly in section, of the pump, on an enlarged scale, showing a fragment of the driving wheel therefor and showing in dotted lines the pump moved to inoperative position.

Fig. 3 is a front elevation of the pump.

Figs. 4 and 5 are vertical sectional views through the pump cylinder, showing the piston in elevation in its two extreme positions.

Fig. 6 is a detail view of the upper end of the pump cylinder and its trunnion, the bearing boss for the latter being shown in section.

Fig. 7 is a section on line VII—VII of Fig. 6.

The numeral 1 designates an automobile motor which may be of any suitable type, the one illustrated comprising four cylinders 2 and a crank case 3 in which operate the pistons, piston rods and cranks (not shown) for rotating the main driving shaft 4. The motor is inclosed by the usual hood 5 at the front end of which is the radiator 6 and at the rear end a dash 7. The motor shaft 4 has a forward extension 8 which carries a pulley 9. A bracket 10, secured to the engine frame, carries a shaft 11 on which is mounted a fan 12 for drawing air through the radiator 6 and driving it back through the hood. The shaft 11 carries a pulley 13 which is driven from the pulley 9 by means of a belt 14. The pump or compressor 15 is preferably mounted directly behind the fan 12 where it will be cooled by the air passing through the latter and where it may be placed in driving connection with the fan driving means, preferably by being provided with a friction wheel or disk which may be brought into direct engagement with the pulley 9. As shown, the pump comprises a frame 16 fixed to a shaft 17 which is journaled in a bracket 18. The latter may be secured to the motor frame in any suitable manner, as by bolts 19. These bolts may be provided especially for securing the bracket 18 in position, but ordinarily this is not necessary as most motors have bolts located at this point either for securing the cylinders to the crank case or for securing the cap on the main bearing, or for other like purposes. If the motor is provided with such bolts, the bracket 18 may be secured in position thereby and thus without necessitating any change in the construction of the motor itself. The pump or compressor proper comprises a cylinder 20 having a laterally projecting trunnion 21 at its upper end which is journaled in a bearing 22 formed in a boss 23 at the upper end of the frame 16. The trunnion 21 may be held in its bearing in any suitable manner, as by means of a cotter pin 24 passing through a hole in the boss and engaging a notch 25 in the trunnion. The notch 25 is sufficiently elongated, as shown in Fig. 7, to permit the necessary oscillatory movement of the cylinder. One or more air inlet holes or ports 26 are formed in the walls of the cylinder at a point where they will be uncovered when the piston reaches the lower limit of its travel. The cylinder is also provided in its upper end with an outlet passage 27 in which is a suitable check valve. As shown, the check valve comprises a ball 28 normally held upon a seat 29 by a spring 30 which is retained in position by a screw plug 31. Obviously any other suitable form of valve may be used.

32 is a piston reciprocating in the cylinder 20, it being preferably provided with a cup disk 33 of leather or other suitable material to make a close fit. The piston is provided at its lower end with an extension terminating in a bearing sleeve 34 in which is journaled a crank pin 35. The latter projects from the side of a crank disk 36 which is journaled upon a pin 37 projecting from the side of the frame 16. The extension portion of the piston 32 is cut away as indicated at 38, so as to clear the crank disk when the piston is down. In this way a very compact structure is produced. The crank disk 36, which may be of any suitable construction, is preferably provided with a friction bearing surface. As shown, the crank disk comprises a member 39 having a central bearing sleeve 40 upon which are mounted one or more disks 41 of leather or other suitable material which are clamped in position by a plate 42 held in position by screws 43 or in any other suitable way. The bearing pin 37 is preferably a plain cylindrical pin, over the end of which the disk 36 may be slipped. The disk will be held in position during the operation of the pump by the pump piston, which slides in the cylinder, the latter being held in position by the cotter pin as above described. Thus it will be seen that upon the removal of the cotter pin 24 the entire pump may be taken apart as the cylinder and piston may be removed and separated and the crank disk 36 may be taken off. The pump is driven by bringing the friction surface of the crank disk into engagement with any rotating part of the motor. In the preferred construction shown, the crank disk is brought into driving engagement with the periphery of the pulley 9, which drives the fan belt. The proportions of the pump are such that it may be mounted between the runs of the fan belt without interfering with the operation of the latter in any way, the crank disk engaging the uncovered portion of the pulley 9. Means are preferably provided for moving the pump into and out of operative engagement with the pulley 9, these means being controllable from the dash of the machine in the preferred embodiment of the invention. As shown, the shaft 17 has a lever 44 fixed thereto which is connected by means of a rod or link 45 to a movable block or nut 46 screwing on the screwthreaded stem 47 of a hand wheel 48. The stem 47 is rotatably mounted in a suitable bearing 49 in the dash. A turn or two of the hand wheel in one direction will draw the pump down so as to hold the crank disk 36 firmly in engagement with the pulley 9 to drive the pump, while turning the hand wheel in the opposite direction will lift the pump to the position shown in dotted lines in Fig. 2. Obviously any other suitable connections may be utilized for operating the pump in this manner.

The air compressed by the pump may be conducted to any suitable point for use or storage. As shown, a pipe 50 leads from the outlet passage 27 of the pump to a connection 51 on the dash of the machine. To this connection a hose 52 may be attached for inflating the tires or the air may be otherwise utilized.

To operate the pump the hand wheel 48 is turned so as to draw the pump down and hold the crank disk in engagement with the pulley 9, it being understood that the motor 1 is in operation. The resulting rotation of the crank disk 36 reciprocates the piston 32 within the oscillating cylinder 20. When the piston is in its lowest position, as shown in Fig. 4, the ports 26 are uncovered, permitting the cylinder to fill with air. In its upward movement the piston first covers the ports 26 and then compresses the air in the cylinder and forces it out through the passage 27. The check valve 28 opens to permit the outward passage of the air but closes during the downward stroke of the piston. The cylinder 26 is preferably thin-walled so that it will be rapidly cooled by the air driven over it by the fan 12. This cooling greatly enhances the efficiency of the pump when used as a compressor.

It will be seen that the entire device is of great simplicity of construction, is positive in operation, and may be attached to an ordinary motor by any one without the use of special tools and without necessitating any changes in the motor itself. It is to be understood that while only one preferred embodiment and application of the invention is shown, the invention is capable of embodiment in modified structures. The principle of the invention may be employed in a pump adapted to operate on either fluid or liquid or to produce either compression or suction, as may be desired.

I claim as my invention:

A pump comprising a frame having a bearing recess therein, a cylinder having a trunnion mounted in said bearing recess, means for securing said trunnion in said recess, a piston reciprocating in said cylinder but capable of disconnection therefrom, a bearing pin carried by said frame, a friction disk removably mounted upon said bearing pin and having a crank pin projecting from the side thereof, said piston having an extended portion with a bearing therein removably engaging said crank pin, said piston being normally retained in said cylinder by its engagement with said crank pin and said friction disk being normally held upon said bearing pin by said piston, whereby when said means for retaining said cylinder trunnion in said bearing recess are released, said cylinder, piston and friction disk may be separated from said frame and from each other.

Witness my hand, this 17th day of April, 1913.

ALBERT H. FEFELLE.

Witnesses:
EDMUND QUINCY MOSES,
ADELINE L. McGEE.